United States Patent
Li et al.

(10) Patent No.: US 10,509,946 B2
(45) Date of Patent: Dec. 17, 2019

(54) METHOD AND DEVICE FOR MATCHING SIGNATURES ON THE BASIS OF MOTION SIGNATURE INFORMATION

(71) Applicant: AITECH, LLC, Buffalo Grove, IL (US)

(72) Inventors: Dongge Li, Hubei (CN); Chengyu Li, Shaanxi (CN)

(73) Assignee: Hangzhou Zhileng Technology Co. Ltd., Hangzhou, Zhejiang (CN)

( * ) Notice: Subject to any disclaimer, the term of this patent is extended or adjusted under 35 U.S.C. 154(b) by 9 days.

(21) Appl. No.: 14/889,320

(22) PCT Filed: May 5, 2014

(86) PCT No.: PCT/CN2014/076803
§ 371 (c)(1),
(2) Date: Nov. 5, 2015

(87) PCT Pub. No.: WO2014/180293
PCT Pub. Date: Nov. 13, 2014

(65) Prior Publication Data
US 2016/0098591 A1   Apr. 7, 2016

(30) Foreign Application Priority Data

May 7, 2013 (CN) .......................... 2013 1 0165256

(51) Int. Cl.
*G06K 9/00* (2006.01)
*H04L 29/06* (2006.01)
(Continued)

(52) U.S. Cl.
CPC ............ *G06K 9/00181* (2013.01); *G06T 7/20* (2013.01); *H04L 63/08* (2013.01); *H04W 12/06* (2013.01); *H04W 12/00508* (2019.01)

(58) Field of Classification Search
None
See application file for complete search history.

(56) References Cited

U.S. PATENT DOCUMENTS

| 9,648,389 B1* | 5/2017 | Pike | ................... H04N 21/4725 |
| 2006/0037990 A1* | 2/2006 | Geise | ..................... G01C 21/36 228/101 |

(Continued)

FOREIGN PATENT DOCUMENTS

| CN | 101299812 A | 11/2008 |
| CN | 102143483 A | 8/2011 |

(Continued)

OTHER PUBLICATIONS

Chinese Patent Office, International Search Report and Written Opinion of International Searching Authority for PCT/CN2014/076800 dated May 15, 2014 (10 pages).

(Continued)

*Primary Examiner* — Chan S Park
*Assistant Examiner* — Elisa M Rice
(74) *Attorney, Agent, or Firm* — Greensfelder, Hemker & Gale, P.C.

(57) ABSTRACT

A method for matching signatures based on motion signature information including acquiring a first signature and at least one second signature that are to be matched, wherein the first signature and the second signature are generated based on a motion object's motion signature information; and matching the first signature and the second signature based on the motion signature information to obtain a corresponding match result.

17 Claims, 3 Drawing Sheets

(51) Int. Cl.
  H04W 12/06 (2009.01)
  G06T 7/20 (2017.01)
  H04W 12/00 (2009.01)

(56) References Cited

U.S. PATENT DOCUMENTS

| | | | | |
|---|---|---|---|---|
| 2006/0092074 | A1* | 5/2006 | Collins | G01S 13/726 |
| | | | | 342/160 |
| 2009/0238282 | A1* | 9/2009 | Gaedke | H04N 19/139 |
| | | | | 375/240.16 |
| 2009/0249261 | A1* | 10/2009 | Kim | G03F 1/36 |
| | | | | 716/132 |
| 2010/0278393 | A1* | 11/2010 | Snook | G06F 3/011 |
| | | | | 382/107 |
| 2012/0007713 | A1* | 1/2012 | Nasiri | G06F 1/1694 |
| | | | | 340/5.81 |
| 2012/0122574 | A1* | 5/2012 | Fitzpatrick | G06T 13/40 |
| | | | | 463/31 |
| 2012/0294487 | A1* | 11/2012 | Nishimura | G06K 9/00986 |
| | | | | 382/103 |
| 2013/0076287 | A1* | 3/2013 | Iwashita | G05B 19/4068 |
| | | | | 318/561 |
| 2013/0322537 | A1* | 12/2013 | Rossato | H04N 19/63 |
| | | | | 375/240.16 |
| 2014/0064582 | A1* | 3/2014 | Schmidt | G06T 7/0012 |
| | | | | 382/128 |
| 2014/0176436 | A1* | 6/2014 | Raffa | G06F 3/017 |
| | | | | 345/158 |

FOREIGN PATENT DOCUMENTS

| | | |
|---|---|---|
| CN | 102292979 A | 12/2011 |
| CN | 102307309 A | 1/2012 |
| CN | 102333313 A | 1/2012 |
| CN | 102693084 A | 9/2012 |
| CN | 102710877 A | 10/2012 |
| CN | 102881137 A | 1/2013 |
| CN | 102955750 A | 3/2013 |
| WO | 2012113272 A1 | 8/2012 |
| WO | 2014180291 A1 | 11/2014 |
| WO | 2014180293 A1 | 11/2014 |
| WO | 2014180294 A1 | 11/2014 |

OTHER PUBLICATIONS

Chinese Patent Office, International Search Report and Written Opinion of International Searching Authority for PCT/CN2014/076803 dated Aug. 13, 2014 (11 pages).
Chinese Patent Office, International Search Report and Written Opinion of International Searching Authority for PCT/CN2014/076804 dated Aug. 7, 2014 (16 pages).

* cited by examiner

METHOD AND DEVICE FOR MATCHING SIGNATURES ON THE BASIS OF MOTION SIGNATURE INFORMATION

CROSS REFERENCE TO RELATED APPLICATION

This application is a U.S. National Stage Entry under 35 USC § 371 of PCT/CN2014/076803 filed on May 5, 2014, which claims priority from Chinese Application No. 201310165256.3 filed on May 7, 2013, both of which are incorporated herein by reference and made a part hereof.

TECHNICAL FIELD

The invention relates to the field of computer technology, especially a technology that matches signatures on the basis of motion signature information.

BACKGROUND

A motion signature generates on the basis of motion pattern, capturing motion pattern and generating corresponding motion signature by MEMS or camera device, which can be used as a password or can match to verify the device on the site detected by sensors. For example, motion signature can be used as the password to unlock or activate devices like door control and payment device etc., which can also use the motion tracking code as the command code of devices to send or receive information, execute and confirm function etc.

Therefore, how to improve the accuracy and efficiency of matching motion signatures has become the problem needed to solve urgently in the field.

SUMMARY

The present invention aims to provide a method and device for matching signatures on the basis of motion signature information.

According to an aspect of the present invention, there is provided a method for matching signatures on the basis of motion signature information, the method comprises following steps, a. acquisition of the first signature and of the at least one second signature that are to be matched, where the first signature is generated on the basis of the motion signature information corresponding thereto, b. matching of the first signature and the second signature on the basis of the motion signature information to acquire a corresponding match result.

According to another aspect of the present invention, there is provided a matching device for matching signatures on the basis of motion signature information, the device comprises following units, The acquisition unit, acquisition of the first signature and of the at least one second signature that are to be matched, where the first signature is generated on the basis of the motion signature information corresponding thereto, The matching unit, matching of the first signature and the second signature on the basis of the motion signature information for acquisition of the corresponding match result.

Compared with the prior art, the present invention matches the signatures on the basis of the motion signature information corresponding to the signatures that are to be matched, thus increasing the accuracy and efficiency in signature matching, and enhancing user experience for a user.

BRIEF DESCRIPTION OF FIGURES

Other objects, signatures, and advantages of the present invention will become apparent upon consideration of the following detailed description of non-limiting embodiments and the accompanying drawings.

The same or similar symbols in the drawings indicate the same or similar units.

DETAILED DESCRIPTION OF THE PREFERRED EMBODIMENT

With drawings show the following instructions to further elaborate the details of this invention.

Figure 1:
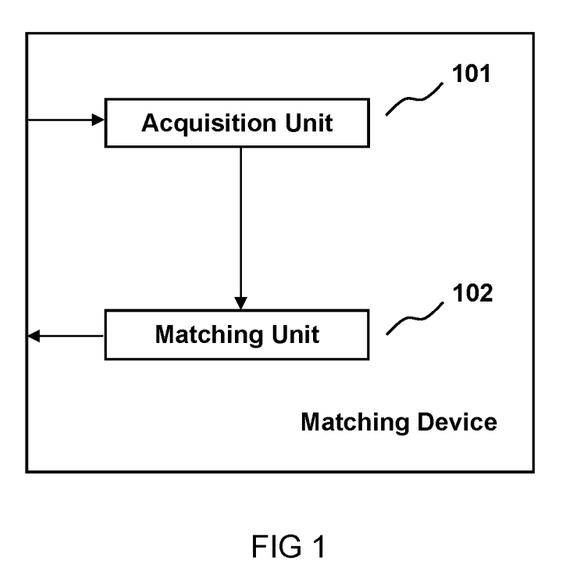
FIG. 1 illustrates a device diagram of matching signatures on the basis of motion signature information according to an aspect of the present invention.

FIG. 1 illustrates a device diagram of matching signatures on the basis of motion signature information according to an aspect of the present invention. The matching device 1 includes the acquisition unit 101, the matching unit 102.

Here, the matching device 1 including but not limited to network device, or controlled device etc. that are to be matched, if the matching device 1 is a network device, the matching device 1 acquires the first signature sent by the first generation device and the at least one second signature sent by the second generation device then matches them, if the matching device 1 is a controlled device that is to be matched, the matching device 1 acquires the at least one second signature sent by remote device etc. matching device then matches the first signature on the basis of the motion signature information. However, it is understood by those skilled in the art that the above matching device only by way of example, other existing or potential matching device that applicable to this invention should belong to the scope of protection of the invention by reference.

The acquisition unit 101 acquires the first signature and the at least one second signature that are to be matched, where the first signature is generated on the basis of the motion signature information corresponding thereto. Specifically, the mode of the acquisition unit 101 acquires the first signature including but not limited to, 1) acquisition of the first signature generated by the motion signature information on the basis of the motion image captured by the image device by calling the image device of the matching device 1.

2) receiving of the first signature sent by the first generation device by WIFI, Bluetooth, Infrared, Internet etc. mode.

Here, the first signature is generated on the basis of the motion signature information corresponding thereto by encoding methods such as Fourier shape descriptor method, geometric parameter method, shape invariant moment method, rotation function method, wavelet descriptor method, etc.

The mode of the acquisition unit 101 acquires the at least one second signature including but not limited to, 1) receiving of the at least one second signature sent by the at least one second generation device or remote device etc. by WIFI, Bluetooth, Infrared, Internet etc. mode.

2) selection of the at least one second signature randomly or sequentially in the signature list corresponds to the matching device 1 on the basis of the first signature.

Here, if there are signatures of predetermined number or time period in the signature list, such as the signature is the predetermined one or sent by the corresponding device. The signature list can be from the matching device 1 or from the third party device connected with the matching device 1 through network.

Here, the at least one signature is acquired by MEMS sensor detection, or, the at least one first signature is acquired by image device, wherein, the image detecting device as described including but not limited to two-dimensional image device and three-dimensional image device etc.

For example, if the matching device 1 is a network device, the first generation device captures one motion image through its image device, such as captures the motion image of the running second generation device and generates the first signature on the basis of the motion signature information of the motion image, subsequently, the first generation device sends the first signature to the matching device 1, the second generation device detects and generates the corresponding second signature through its MEMS sensor, such as velocities, accelerations etc. sensors, and sends the second signature to the matching device 1, the acquisition unit 101 of the matching device 1 acquires the first signature and the second signature that are to be matched.

As another example, if the matching device 1 is a controlled device etc. that is to be matched, the second generation device detects and generates the corresponding second signature through its MEMS sensor, such as velocities, accelerations etc. sensors, and sends the second signature to the matching device 1, the acquisition unit 101 of the matching device 1 acquires the second signature and the motion image captured by calling the image device, such as captures the motion image of the running second generation device and generates the first signature on the basis of the motion signature information of the motion image, the acquisition unit 101 takes the generated first signature and the received second signature as the first signature and the second signature that are to be matched.

However, it is understood by those skilled in the art that the above acquisition mode of the first signature and the second signature only by way of example, other existing or potential acquisition mode of the first signature and the second signature that applicable to this invention should belong to the scope of protection of the invention by reference.

The matching unit 102 matches the first signature and the second signature on the basis of the motion signature information to acquire a corresponding match result. Specifically, the matching unit 102 matches the first signature and the second signature on the basis of the motion signature information of the first signature like the image feature, the image line segment feature, the image closed contour etc. motion trajectory information as well as velocities, accelerations and motion directions relative changes etc. motion trend information to acquire a corresponding match result. For example, encodes the first signature on the basis of the corresponding motion trend information as 1233, the acquisition unit 101 acquires its first signature and the predetermined second signature in the matching device 1 as 1234, the matching unit 102 matches the first signature and the second signature accordingly, determines the two signatures not match. Preferably, the matching device 1 can also predetermine a tolerance, the two signatures can be determined as match within the tolerance, otherwise not match. For example, if the predetermined second signature is 1234 and the first signature is 1232, then not match, if the first signature is 1233, then match. However, it is understood by those skilled in the art that the numbers here only by way of example, should not be considered as any limitation to the present invention.

As another example, when the second signature is generated on the basis of the motion signature information corresponding thereto, the matching unit 102 matches the first signature and the second signature as described on the basis of the motion signature information of the first signature and the second signature to acquire a corresponding match result.

However, it is understood by those skilled in the art that the above matching mode of the first signature and the second signature only by way of example, other existing or potential matching mode of the first signature and the second signature that applicable to this invention should belong to the scope of protection of the invention by reference.

In an embodiment, the matching unit 102 comprises a match unit (not shown) and a determining unit (not shown). The match unit matches the first signature and the at least one second signature as described on the basis of the motion signature information to acquire at least one corresponding match value, the determining unit determines the match result on the basis of the at least one corresponding match value as described and the predetermined match threshold.

Here, the matching device 1 can also predetermine a match threshold, when the feature matching (feature similarity) of the first signature and the second signature is bigger than the predetermined match threshold, determines the two signatures match.

Specifically, the match unit matches the first signature and the second signature on the basis of the motion signature information of the first signature and the second signature to acquire a corresponding feature matching, such as the feature similarity of the two signatures, the determining unit determines the match result on the basis of the feature matching and the predetermined match threshold, for example, when the feature matching (feature similarity) is bigger than the match threshold, determines the first signature and the second signature match, when the feature matching (feature similarity) is smaller than the match threshold, determines the first signature and the second signature not match.

In another embodiment, the matching unit 102 also comprises a match unit (not shown) and a determining unit (not shown). The match unit matches the first signature and the at least one second signature as described on the basis of the motion signature information to acquire at least one corresponding feature matching, the determining unit determines the most match one on the basis of the at least one corresponding feature matching as the match result.

For example, if the matching device 1 is a controlled device etc. that is to be matched, it receives more second signatures sent by more remote device etc., the match unit matches the first signature and the second signature on the basis of the motion signature information of the first signature and the received more second signatures to acquire corresponding more signature matching, such as the feature matching is the feature similarity of the two signatures, the determining unit selects the most match one of more feature matching and determines its corresponding matching device as the remote device, or, the determining unit screens the feature matching bigger than the match threshold on the basis of the predetermined match threshold, then selects the biggest feature matching and determines its corresponding matching device as the remote device.

The motion signature information of the signature including but not limited to motion trajectory feature information, motion trend feature information etc.

In a preferred embodiment, the motion signature information comprises the motion trajectory feature information, wherein, the matching as described shall be on the basis of any of the following, image feature of the motion trajectory,
image line segment feature of the motion trajectory,
image closed contour of the motion trajectory.

Specifically, when the motion signature information comprises motion trajectory feature information, the matching unit 102 matches the first signature and the second signature on the basis of the image feature, image line segment feature and image closed contour etc. information of the motion trajectory. For example, the motion signature information on the basis of the motion image like motion trajectory feature information, encodes the first signature, the matching unit 102 calculates the feature matching (feature similarity) of the first signature and the second signature by the matching method on the basis of image shape feature. Here, the encoding method including but not limited to Fourier shape descriptor method, geometric parameter method, shape invariant moment method, rotation function method, wavelet descriptor method, etc. Here, image shape featured matching method comprises matching on the basis of image feature, image line segment feature, image closed contour and other advanced feature matching etc. Wherein, image featured matching method comprises minimum mean square error matching, fast matching and Haussdorff point distance matching etc., image line segment featured matching method comprises HYPER matching, Chafer matching etc., image closed contour featured matching method comprises Fourier shape descriptor, HRP descriptor, other advanced featured matching method comprises relaxation method, energy minimizer etc.

However, it is understood by those skilled in the art that the above matching method only by way of example, other existing or potential matching method that applicable to this invention should belong to the scope of protection of the invention by reference.

In another preferred embodiment, the motion signature information comprises the motion trend feature information, wherein, the matching as described shall be on the basis of any of the following, matching the first signature and the second signature correspondingly and respectively,
detecting and matching the second signature on the basis of the first signature.

For example, the generation device, such as the first generation device and the second generation device etc., encodes by the motion trend feature information like the corresponding motion velocities and motion directions relative changes etc., the matching unit 102 can match the first signature and the second signature correspondingly and respectively, when the encoding lengths of the first signature and the second signature that are to be matched are the same or similar, matching correspondingly and respectively can be performed, the two match if the encoding are the same, the two not match if the encoding are different, or, the matching unit 102 can match within a certain fault tolerance, the two match if the feature matching (feature similarity) is bigger than the predetermined match threshold, the two not match if it is smaller than the predetermined match threshold.

As another example, the matching unit 102 detects and matches the second signature on the basis of the first signature, when the encoding lengths of the first signature and the second signature that are to be matched are quite different, detecting and matching can be performed, such as before-after translate the shorter signature in a certain location to acquire the best match as the match result of the two. Here, string matching can be performed for detecting and matching, including but not limited to BF Algorithm, KMP Algorithm, BM Algorithm, Sunday Algorithm etc., or other Dynamic Time Wrapping etc. dynamic programming algorithm.

Here, the generation device can eliminate the encoding influence caused by different devices detection through the encoding of the speed, direction relative trend or the two combination, such as use up (+1), even (0), down (−1) etc. to describe the motion trend information, etc.

Preferably, the matching unit 102 pre-matches the first signature and the second signature to acquire the pre-match result on the basis of their auxiliary feature information, matches the first signature and the second signature to acquire the corresponding match result on the basis of the motion feature information and the pre-match result.

Wherein, the auxiliary feature information as described shall comprise any of the following, the generation time information of the signature,
the generation location information of the signature,
the generation device information corresponding to the signature.

Specifically, the acquisition unit 101 generates the first signature that is to be matched on the basis of the motion image captured by its image device and the motion feature information of the motion image, or, receives the first signature that is to be matched sent by the first generation device, the first signature is one the basis of the motion feature information of the corresponding motion image, then, the matching unit 102 pre-matches the first signature and the second signature to acquire the pre-match result on the basis of their auxiliary feature information, such as the generation time information, the generation location information of the signature, the corresponding generation device (the matching device 1 or the first generation device) information of the first signature, such as determines whether or not the generation time, the generation location of the first signature and the second signature are similar, whether or not the second signature and the generation device generated the first signature have the connection record, matches the first signature and the second signature to acquire the corresponding match result on the basis of the motion feature information and the pre-match result. For example, the matching unit 102 matches the first signature and the second signature on the basis of the motion feature information and determines the two match, only if the generation time or the generation location of the first signature and the second signature are similar, the matching unit 102 determines the two signature match.

Here, the generation location information of the signature can be acquired by the device GPS, WIFI, communication base etc. method. The matching device 1 can only match results in a certain time and location range. Not match if not satisfies this condition. When the matching device 1 receives more signatures, the matching can prompt limit the ones within a time and location range to accelerate matching and searching as well as reduce the mismatch.

Here, the signature corresponding generation device related information including but not limited to the device IP, ID, connection record, connection frequency etc.

Like the service time and location information, the matching device 1 can match the device close to the network location first. The locations close to the network comprise terminals in the same subnet, gateway or router. For example, the device with IP 124.10.2.01 is likely connected to the device with IP 124.10.2.02. The matching device 1 matches the device close to the network location first, or there are more match candidates, the device close to the network location owns matching priority. Thus the device close to the network location connects faster and easier.

A device ID is the unique device code to unique identifies a device, such as MAC address, CPU serial number etc. With a device ID, the matching device 1 can unique identifies the possible connection device. Thus the matching device 1 can record the permission setting between device connections, like the device ID or type of a device permitted or not to connect. The setting can be set by a user or default set on the basis of the device type. The matching device 1 can also record the connected device ID and save them. When a device sends motion signature that is to be matched, the matching device 1 can detect all the device can be connected or not, then only searches and matches the signatures from the device can be connected or eliminates the signatures from the device can not be connected. If there are more match candidates signatures, the system shall priority match the frequently connected devices. For example, the device that a device used to (or recently) connected can be used for first selecting the device signature for matching, fast connection can be set if they match and no more searching is necessary. Further, the matching device 1 can record the connection frequency (or times) between devices, which can be used for selecting signatures for priority matching, that is to first matching the signatures of the devices with connection frequency higher than the threshold. The above information can also be used to weighted calculate the feature matching, such as, Final feature matching=$w1$*initial feature matching+$w2$*connection frequency Here, the initial feature matching is the feature matching between the first signature and the second signature acquired by the matching unit 102 matching, the final feature matching is the feature matching acquired by final calculation, the connection frequency is the frequency that first signature and the second signature corresponding devices connect, w1, w2 are weightings.

However, it is understood by those skilled in the art that the above auxiliary feature information only by way of example, other existing or potential auxiliary feature information that applicable to this invention should belong to the scope of protection of the invention by reference.

Preferably, the matching device 1 also comprises pre-processing device (not shown). The pre-processing device pre-processes the first signature and the second signature to acquire the pre-processed first signature and the second signature, the matching unit 102 matches pre-processed first signature and the second signature on the basis of the motion feature information to acquire the corresponding matching result, wherein, the pre-processing shall comprise any of the following,
mapping,
decoding,
encoding.

Specifically, the pre-processing device pre-processes like mapping, decoding, encoding the first signature and the second signature to acquire the pre-processed first signature and the second signature. For example, the pre-processing device maps the three-dimensional signature to the two-dimensional signature, decoding one of the encoded signature to match another un-encoded signature, encoding one of the un-encoded signature to match another encoded signature, for another example, when the first signature and the second signature are differently encoded, the pre-processing device can decode one of the signature and encode the signature with the encoding method of another signature, then the two signature are encoded with the same method for the easier following matching.

Subsequently, the matching unit 102 matches the pre-processed first signature and the second signature on the basis of the motion feature information to acquire the corresponding matching result.

In this case, since at least the first signature is generated on the basis of the motion signature information of the corresponding motion image, which motion can be captured by a two-dimensional or three-dimensional image device, the second signature can be generated by using MEMS etc. three-dimensional motion detection mode. Different device have different motion detection mode and angle, which generates different signature. Using global features, prominent features, relative size, and affine invariant features has certain advantages, no significant change in signature hardware and capture angle will be produced. For example, the sloshing frequency of global features, the folding point time of prominent features, location and so on will not be changed significantly. Also relative size (up, even, down) can better tolerate the error and noise interference caused by precision detection.

For example, the pre-processing device projects the motion or signature of the three-dimensional space onto a two-dimensional space and generates signature (especially images or vertical or direction towards the equipment). The signature generated by MEMS captured three-dimensional motion and the signature generated by the different image device are different on the reflection/projection plane. Image device at different angles have different two-dimensional image plane with some projection relationship, as long as it has relative angle, the conversion can be acquired by simple geometrical relationship.

The signature recording two (three) dimensional trajectory and corresponding position time can map from three-dimensional plane to two-dimensional plane or mapping between different two-dimensional planes. The image device direction can be easily given if the image device has Compass, etc. orientation sensor. The positional relation of the three-dimensional and two-dimensional image plane is also determined. Likewise, the relative direction of any two image devices can be easily acquired. If there is no direction sensor, the traditional image calibration method can also detect the relative direction between different image devices planes (relative calibration) or the absolute position relation of the any image device relative to the earth (absolute calibration).

Once the signatures from different planes are converted into the same plane, their matching effect of the same motion can be more stable. If the plane relationship of two signatures is unknown, the search maximum matching method can be used. When the two signatures generated by the same motion are mapped onto the same plane, they have the maximum matching similarity. Thus, the pre-processing device can map one of the signatures at a certain angle and distance (amplification factor) in a certain change range and interval step-by-step (such as clockwise and counterclockwise rotate within 45 degrees by every 5 degrees). Matching with another signature once and record their similarity for each mapping. Ultimately take its maximum similarity value as the final matching value.

However, it is understood by those skilled in the art that the above pre-processing method only by way of example, other existing or potential pre-processing method that applicable to this invention should belong to the scope of protection of the invention by reference.

Preferably, the acquisition unit 101 acquires the first signature corresponding to the first generation device, wherein, the first signature generates on the basis of the corresponding motion signature information, the acquisition unit 101 may also acquires the second signature corresponding to the second generation device, wherein, the second signature generates on the basis of the corresponding motion signature information, the second signature and the first signature corresponding to the same predetermined time threshold.

Specifically, the acquisition unit 101 receives the first signature sent by the first generation device by WIFI, Bluetooth, Infrared, Internet etc. mode, for example, the first signature is generated by the first generation device on the basis of its corresponding motion signature information, and then, the acquisition unit 101 receives the second signature sent by the second generation device by WIFI, Bluetooth, Infrared, Internet etc. mode, for example, the second signature is generated by the second generation device on the basis of its corresponding motion signature information, and the second signature and the first signature corresponding to the same predetermined time threshold. That is, the generation time of the second signature and the first signature corresponding to two different generation devices, the two signatures are generated in the same predetermined period of time.

More preferably, the acquisition unit 101 acquires the second signature in the signature table corresponding to the second generation device on the basis of the first signature, wherein the second signature is generated on the basis of its corresponding motion signature information and the second signature and the first signature corresponding to the same predetermined time threshold.

Specifically, the acquisition unit 101 acquires the corresponding second signature in the signature table on the basis of the first signature and the first signature generation time information etc., the second signature and the first signature corresponding to the same predetermined time threshold ensures the two signatures are generated in the same predetermined period of time.

Here, for example, the signature table stores a predetermined amount or period of time signatures, and the signatures receive signature sent by corresponding generation device. The signature table can be located in the matching device 1 or a third-party device connected with the matching device 1 via network.

More preferably, the matching device 1 can also create or update the signature table on the basis of the matching result.

Specifically, the matching device 1 creates or updates the signature table on the basis of the matching result, such as stores or deletes signature in the signature table. For example, different devices have different send time, if not match, the matching device 1 can store the first signature or the second signature in the signature table for the future signature matching. If match, depending on the application, the matching device 1 can delete the stored second signature in the signature table, or, still store for the future signature matching, signatures received in predetermined period of time can be selected in a subsequent match for best match. When signatures stored in the signature table exceed the predetermined amount, or, the generation time of the signature stored in the signature table is earlier than the predetermined time, the matching device 1 can delete no longer used signature in accordance with the first in first out or similar rules.

However, it is understood by those skilled in the art that the above signature table creating or updating method only by way of example, other existing or potential signature table creating or updating method that applicable to this invention should belong to the scope of protection of the invention by reference.

Preferably, the acquisition unit 101 acquires more candidate signatures corresponding to more candidate devices, wherein the more candidate signatures are generated on the basis of the corresponding motion signature information, and the more candidate signatures and the first signature corresponding to the same predetermined time threshold, wherein, the matching unit 102 matches the first signature with the more candidate signatures respectively on the basis of the motion signature information to acquire the corresponding more matching results, determines the best matching result from the more matching results and determines the second generation device corresponding to the best match result.

Specifically, the acquisition unit 101 receives more candidate signatures respectively sent by the more candidate devices by WIFI, Bluetooth, Infrared, Internet etc. mode on the basis of the corresponding motion signature information through interaction, these candidate signatures and the first signature corresponding to the same predetermined time threshold, alternatively, the acquisition unit 101 acquires more candidate signatures from the signature table that respectively corresponding to more candidate devices, subsequently, the matching unit 102 matches the first signature with more candidate signatures respectively to acquire the corresponding more matching results, then, determines the best match from the more matching results and determines the corresponding second generation device on the basis of the best match corresponding signature.

Preferably, the acquisition unit 101 acquires the first signature and the second signature that are to be matched, wherein the first signature comprises one or more first sub-signatures that are generated on the basis of the corresponding motion signature information, the matching unit 102 matches at least one of the one or more first sub-signatures with the second signature to acquire corresponding candidate matching results, then determines the matching result corresponding to the first signature and the second signature on the basis of the candidate matching results and predetermined rules.

Specifically, the first signature received by the acquisition unit 101 comprises one or more first sub-signatures, which can be acquired by packet processing the first signature, the packet can be processed by the first generation device that generated the first signature or the matching device 1.

Subsequently, the matching unit 102 matches at least one of the one or more first sub-signatures with the second signature to acquire corresponding candidate matching results. Here, the matching processing including but not limited to parallel matching processing, the serial matching processing. For example, the parallel matching processing simultaneously matches more first sub-signatures with the second signature respectively, the serial matching processing matches one first sub-signature with the second signature first, then matches the second first sub-signature with the second signature. When the matching device 1 parallel matching processing the at least one first sub-signature with the second signature, the matching device 1 may also send the at least one first sub-signature to other matching devices to make more matching devices perform matching processing simultaneously, the matching processing time will be shorten. When the matching device 1 serial matching processing the at least one first sub-signature with the second signature, and the matching device 1 uses "and" mode combine matching results, if one of the first sub-signature and the second signature not match, the matching unit 102 does not need to matching processing other first sub-signature, the matching processing time will be shorten.

Then, the matching unit 102 determines the corresponding matching result of the first signature and the second signature on the basis of the acquired candidate matching result and the predetermined rules. For example, if at least one of the candidate matching results match, then the first signature and the second signature match, if the match amount in the candidate matching results exceeds the predetermined threshold, then the first signature and the second signature match, if all the candidate matching results match, then the first signature and the second signature match.

However, it is understood by those skilled in the art that the above predetermined rules only by way of example, other existing or potential predetermined rules that applicable to this invention should belong to the scope of protection of the invention by reference.

Figure 2:
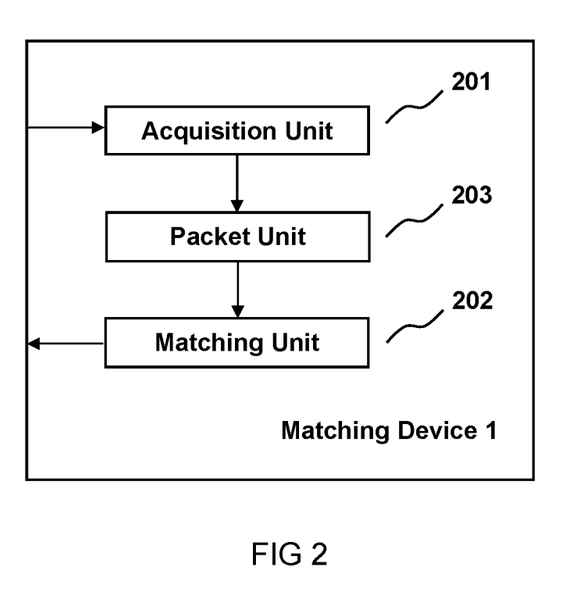
FIG. 2 illustrates a device diagram of matching signatures on the basis of motion signature information according to a preferred embodiment of the present invention.

FIG. 2 illustrates a device diagram of matching motion signature on the basis of motion signature information according to a preferred embodiment of the present invention. The matching device 1 also comprises packet unit 203. Refer FIG. 2 for the details of the preferred embodiment, specifically, the acquisition unit 101 acquires the first signature that is to be matched and the at least one second signature, wherein the first signature is generated on the basis of the corresponding motion signature information, the packet unit 203 packets the first signature and the second signature to acquire one or more first sub-signatures and one or more second sub-signatures, the matching unit 202 matches at least one of the one or more first sub-signatures with at least one of the one or more second sub-signatures on the basis of the motion signature information to acquire the corresponding candidate matching results, then determines the matching results corresponding to the first signature and the second signature on the basis of the candidate matching results and the predetermined rules. Wherein the acquisition unit 201 is the same or basically the same with the according one shown in FIG. 1, so won't be covered again while incorporated herein by reference.

The packet unit 203 packets the first signature and the second signature to acquire one or more first sub-signatures and one or more second sub-signatures. Specifically, the packet unit 203 packets the first signature on the basis of the acquisition unit 201 acquired the first signature and the second signature as well as the predetermined sub-signature length. For example, packet to acquire one or more the first sub-signature and one or more the second sub-signature, which may be generated in different motion feature or encoding method, each of the first sub-signature matching can be separately to acquire candidate matching results respectively, the final matching result is the combination of more candidate matching results, each matching can be matched in the same or different matching devices. The final matching result can be the "And", "Or" combination of all candidate matching results. "And" determines match when all candidate matching results is match, the final matching result is match, "Or" determines match when one of the candidate matching result is match, the final matching result is match.

Here, if the first signature has more encoding modes, the second signature only has one encoding mode, the packet unit 203 can only packets the first signature.

Subsequently, the matching unit 202 matches at least one or more first sub-signatures with at least one of the one or more second sub-signatures on the basis of the motion signature information to acquire the corresponding candidate matching results, then determines the matching result corresponding to the first signature and the second signature on the basis of the candidate matching results and predetermined rules.

Here, if the packet unit 203 only packets the first signature, the matching unit 202 may match at least one of the one or more first sub-signatures acquired by the first signature packet processing with the second signature to acquire corresponding candidate matching result, then determines the matching result corresponding to the first signature and the second signature on the basis of the candidate matching results and predetermined rules.

Preferably, the packet unit 203 packets the first signature and the second signature on the basis of their generation related information to acquire one or more the first sub-signatures and one or more the second sub-signatures, wherein the different sub-signatures correspond to different generation related information, Wherein the generation related information shall comprise any of the following, The motion signature information of the motion signature, The encoding of the motion signature.

Here, the easiest packet processing is to divide a signature into several sections, which is divided into several signature sequences, then sectional matching. Each section can generate encoding on the basis of different motion signature information, for example, one sub-signature is generated on the basis of the motion global features, another sub-signature is generated on the basis of the motion prominent features. The packet processing can also be generated on the basis of different encodings, for example, one sub-signature encodes on the basis of the motion signature value, another sub-signature encodes on the basis of the change range or two-valued value. Different sub-signature can be matched in serial mode, that is to match the first section (one first sub-signature and one second sub-signature) and match the next section, if the first section not match, the rest sections combined in "And" may not necessarily match. So the sections with short match searching time can be matched first to avoid the rest time consuming matching. This coarse-to-fine matching strategy can improve the matching speed.

Preferably, the predetermined rules shall comprise any of the following,

Determine the matching results on the basis of the weighted sum of all sections candidate matching results.

Determine the matching results on the basis of the logical combination of all sections candidate matching results.

Here, the predetermined rules shall comprise the weighted sum of all sections candidate matching results to determine the matching result, for example, when matches the at least one first signature with at least one second signature, the acquired weighted sum of the matched amount in the candidate matching results exceeds the predetermined threshold value, it is determined that the first signature and the second signature match.

The predetermined rules also comprise the logical combination of all sections candidate matching results to determine the matching result. For example, when the predetermined rules comprise the logical "And" combination on the basis of each section candidate matching results to determine the matching result, only when all the candidate matching results match, the first signature and the second signature match. As another example, when the predetermined rules comprise the logical "Or" combination on the basis of each section candidate matching results to determine the matching result, as long as one of the candidate matching result is match, the first signature and the second signature match.

Preferably, the packet processed first signature sequence and the second signature sequence can be matched by different matching devices.

Here, each section matching can be assigned to different matching devices for improving matching speed and efficiency. In some applications, this approach can also achieve security purpose. For example, device A sends section 1 to device B for matching the section 1 detected by device B, and device B sends section 2 to device A for matching the section 2 detected by device A, they match only when the both two match. Thus, matching is divided into two devices, any device has only one half of the signature and the matching. The device and section combination may be determined by the predetermined rules, such as the device with the minimum serial number and section 1 etc.

Figure 3:
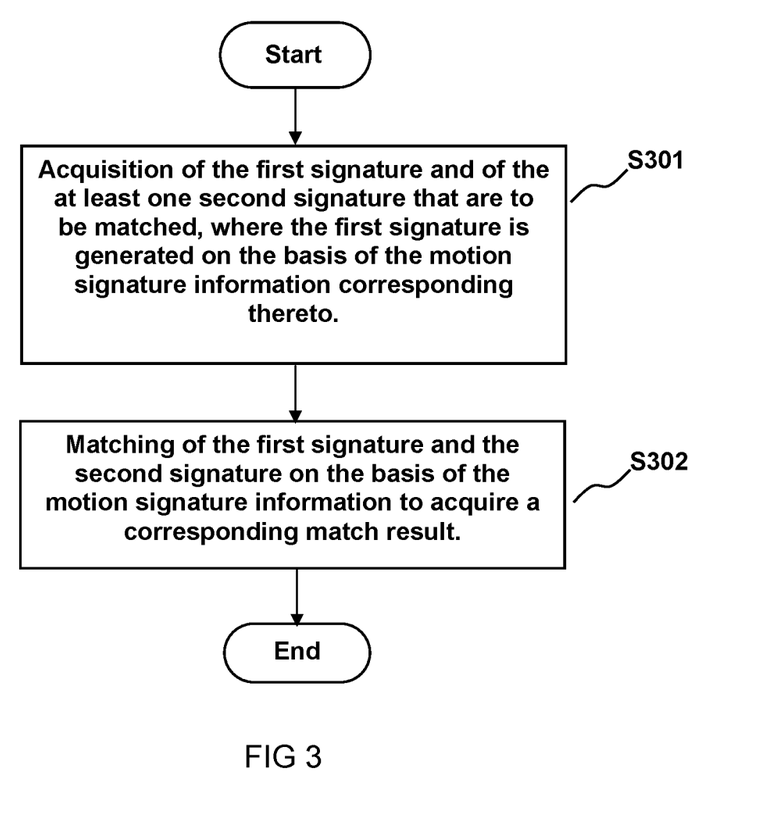
FIG. 3 illustrates a method flow chart of matching signatures on the basis of motion signature information according to another aspect of the present invention.

FIG. 3 illustrates a method flow chart of matching signature on the basis of motion signature information according to another aspect of the present invention.

Here, the matching device 1 including but not limited to network device, or controlled device etc. that are to be matched, if the matching device 1 is a network device, the matching device 1 acquires the first signature sent by the first generation device and the second signature sent by the second generation device then matches them, if the matching device 1 is a controlled device that is to be matched, the matching device 1 acquires the second signature sent by remote device etc. matching device then matches the first signature on the basis of the motion signature information of the motion image. However, it is understood by those skilled in the art that the above matching device only by way of example, other existing or potential matching device that applicable to this invention should belong to the scope of protection of the invention by reference.

In step S301, the matching device 1 acquires the first signature and the second signature that are to be matched, where the first signature is generated on the basis of the motion signature information corresponding thereto of the motion image. Specifically, in step S301, the mode of the matching device 1 acquires the first signature including but not limited to, 1) acquisition of the first signature generated by the motion signature information on the basis of the motion image captured by the image device by calling the image device of the matching device 1.

2) receiving of the first signature sent by the first generation device by WIFI, Bluetooth, Infrared, Internet etc. mode.

Here, the first signature is generated on the basis of the motion signature information of the motion image by encoding methods such as Fourier shape descriptor method, geometric parameter method, shape invariant moment method, rotation function method, wavelet descriptor method, etc.

In step S301, the mode of the matching device 1 acquires the second signature including but not limited to, 1) receiving of the second signature sent by the second generation device by WIFI, Bluetooth, Infrared, Internet etc. mode.

2) selection of the second signature randomly or sequentially in the signature list corresponds to the matching device 1 on the basis of the first signature.

Here, if there are signatures of predetermined number or time period in the signature list, such as the signature is the predetermined one or sent by the corresponding device. The signature list can be from the matching device 1 or from the third party device connected with the matching device 1 through network.

For example, if the matching device 1 is a network device, the first generation device captures one motion image through its image device, such as captures the motion image of the running second generation device and generates the first signature on the basis of the motion signature information of the motion image, subsequently, the first generation device sends the first signature to the matching device 1, the second generation device detects and generates the corresponding second signature through its MEMS sensor, such as velocities, accelerations etc. sensors, and sends the second signature to the matching device 1, in step S301, the matching device 1 acquires the first signature and the second signature that are to be matched.

As another example, if the matching device 1 is a controlled device etc. that is to be matched, the second generation device detects and generates the corresponding second signature through its MEMS sensor, such as velocities, accelerations etc. sensors, and sends the second signature to the matching device 1, in step S301, the matching device 1 acquires the second signature and the motion image captured by calling the image device, such as captures the motion image of the running second generation device and generates the first signature on the basis of the motion signature information of the motion image, the matching device 1 takes the generated first signature and the received second signature as the first signature and the second signature that are to be matched.

However, it is understood by those skilled in the art that the above acquisition mode of the first signature and the second signature only by way of example, other existing or potential acquisition mode of the first signature and the second signature that applicable to this invention should belong to the scope of protection of the invention by reference.

In step S302, the matching device 1 matches the first signature and the second signature on the basis of the motion signature information to acquire a corresponding match result. Specifically, in step S302, the matching device 1 matches the first signature and the second signature on the basis of the motion signature information of the first signature like the image feature, the image edge feature, the image closed contour etc. motion trajectory information as well as velocities, accelerations and motion directions relative changes etc. motion trend information to acquire a corresponding match result. For example, encodes the first signature on the basis of the corresponding motion trend information of the motion image as 1233, in step S302, the matching device 1 acquires its first signature and the predetermined second signature in the matching device 1 as 1234, in step S302, the matching device 1 matches the first signature and the second signature accordingly, determines the two signatures not match. Preferably, the matching device 1 can also predetermine a tolerance, the two signatures can be determined as match within the tolerance, otherwise not match. For example, if the predetermined second signature is 1234 and the first signature is 1232, then not match, if the first signature is 1233, then match. However, it is understood by those skilled in the art that the numbers here only by way of example, should not be considered as any limitation to the present invention.

As another example, when the second signature is generated on the basis of the motion signature information corresponding thereto of the motion image, in step S302, the matching device 1 matches the first signature and the second signature as described on the basis of the motion signature information of the first signature and the second signature to acquire a corresponding match result.

However, it is understood by those skilled in the art that the above matching mode of the first signature and the second signature only by way of example, other existing or potential matching mode of the first signature and the second signature that applicable to this invention should belong to the scope of protection of the invention by reference.

Preferably, step S302 comprises a sub-step S302a (not shown) and a sub-step S302b (not shown). In sub-step S302a, the matching device 1 matches the first signature and the second signature as described on the basis of the motion signature information to acquire corresponding match, in sub-step S302b, the matching device 1 determines the match result on the basis of the corresponding match as described and the predetermined match threshold.

Here, the matching device 1 can also predetermine a match threshold, when the feature matching (feature similarity) of the first signature and the second signature is bigger than the predetermined match threshold, determines the two signatures match.

Specifically, in sub-step S302a, the matching device 1 matches the first signature and the second signature on the basis of the motion signature information of the first signature and the second signature to acquire a corresponding feature matching, such as the feature similarity of the two signatures, in sub-step S302b, the matching device 1 determines the match result on the basis of the feature matching and the predetermined match threshold, for example, when the feature matching (feature similarity) is bigger than the match threshold, determines the first signature and the second signature match, when the feature matching (feature similarity) is smaller than the match threshold, determines the first signature and the second signature not match.

More preferably, the matching device 1 can also acquires more candidate signatures corresponding to more candidate devices, the more candidate signatures on the basis of the corresponding motion signature information of the motion image, in sub-step S302a, the matching device 1 matches the first signature with the more candidate signatures respectively to acquire more candidate signature matching, in sub-step S302b, the matching device 1 selects the biggest signature matching from the candidate signature matching and takes its corresponding candidate signature as the second signature, then determines the corresponding second generation device, or in sub-step S302b, the matching device 1 screens the candidate signature matching that are bigger than the matching threshold on the basis of the predetermined matching threshold, further screens the biggest signature matching from them and takes its corresponding candidate signature as the second signature, then determines the corresponding second generation device.

The motion signature information of the signature including but not limited to motion trajectory feature information, motion trend feature information etc. In a preferred embodiment, the motion signature information comprises the motion trajectory feature information, wherein, the matching as described shall be on the basis of any of the following,
  image feature of the motion trajectory,
  image edge feature of the motion trajectory,
  image closed contour of the motion trajectory.

Specifically, when the motion signature information comprises motion trajectory feature information, in step S302, the matching device 1 matches the first signature and the second signature on the basis of the image feature, image line segment feature and image closed contour etc. information of the motion trajectory. For example, the motion signature information on the basis of the motion image like motion trajectory feature information, encodes the first signature, in step S302, the matching device 1 calculates the feature matching (feature similarity) of the first signature and the second signature by the matching method on the basis of image shape feature. Here, the encoding method including but not limited to Fourier shape descriptor method, geometric parameter method, shape invariant moment method, rotation function method, wavelet descriptor method, etc. Here, image shape featured matching method comprises matching on the basis of image feature, image line segment feature, image closed contour and other advanced feature matching etc. Wherein, image featured matching method comprises minimum mean square error matching, fast matching and Haussdorff point distance matching etc., image line segment featured matching method comprises HYPER matching, Chafer matching etc., image closed contour featured matching method comprises Fourier shape descriptor, HRP descriptor, other advanced featured matching method comprises relaxation method, energy minimizer etc.

However, it is understood by those skilled in the art that the above matching method only by way of example, other existing or potential matching method that applicable to this invention should belong to the scope of protection of the invention by reference.

In another preferred embodiment, the motion signature information comprises the motion trend feature information, wherein, the matching as described shall be on the basis of any of the following,
  matching the first signature and the second signature directly,
  detecting and matching the second signature on the basis of the first signature.

For example, the generation device, such as the first generation device and the second generation device etc., encodes by the motion trend feature information like the corresponding motion velocities and motion directions relative changes etc., in step S302, the matching device 1 can match the first signature and the second signature directly, when the encoding lengths of the first signature and the second signature that are to be matched are the same or similar, matching directly can be performed, the two match if the encoding are the same, the two not match if the encoding are different, or, in step S302, the matching device 1 can match within a certain fault tolerance, the two match if the feature matching (feature similarity) is bigger than the predetermined match threshold, the two not match if it is smaller than the predetermined match threshold.

As another example, in step S302, the matching device 1 detects and matches the second signature on the basis of the first signature, when the encoding lengths of the first signature and the second signature that are to be matched are quite different, detecting and matching can be performed, such as before-after translate the shorter signature in a certain location to acquire the best match as the match result of the two.

Here, string matching can be performed for detecting and matching, including but not limited to BF Algorithm, KMP Algorithm, BM Algorithm, Sunday Algorithm etc., or other Dynamic Time Wrapping etc. dynamic programming algorithm.

Here, the generation device can eliminate the encoding influence caused by different devices detection through the encoding of the speed, direction relative trend or the two combination, such as use up (+1), even (0), down (−1) etc. to describe the motion trend information, etc.

Preferably, in step S301, the matching device 1 acquires the first signature that is to be matched, the first signature is generated on the basis of the motion signature information of the corresponding motion image, then acquires the second signature that is to be matched with the first signature on the basis of the auxiliary feature information of the first signature, the auxiliary feature information of the second signature corresponds to the second signature, wherein, the auxiliary feature information as described shall comprise any of the following, the generation time information of the signature,
the generation location information of the signature,
the generation device information corresponding to the signature.

Specifically, in step S301, the matching device 1 generates the first signature that is to be matched on the basis of the motion image captured by its image device and the motion feature information of the motion image, or, receives the first signature that is to be matched sent by the first generation device, the first signature is one the basis of the motion feature information of the corresponding motion image, then, in step S301, the matching device 1 acquires the second signature that is to be matched with the first signature on the basis of the auxiliary feature information of the first signature, such as the generation time information, the generation location information of the signature, the corresponding generation device (the matching device 1 or the first generation device) information of the first signature, like acquires the second signature that has similar generation time and generation location with the first signature, or acquires the second signature that generated by the device that has connection record of the generation device.

Here, the generation location information of the signature can be acquired by the device GPS, WIFI, communication base etc. method. The matching device 1 can only match results in a certain time and location range. Not match if not satisfies this condition. When the matching device 1 receives more signatures, the matching can prompt limit the ones within a time and location range to accelerate matching and searching as well as reduce the mismatch.

Here, the signature corresponding generation device related information including but not limited to the device IP, ID, connection record, connection frequency etc.

Like the service time and location information, the matching device 1 can match the device close to the network location first. The locations close to the network comprise terminals in the same subnet, gateway or router. For example, the device with IP 124.10.2.01 is likely connected to the device with IP 124.10.2.02. The matching device 1 matches the device close to the network location first, or there are more match candidates, the device close to the network location owns matching priority. Thus the device close to the network location connects faster and easier.

A device ID is the unique device code to unique identifies a device, such as MAC address, CPU serial number etc. With a device ID, the matching device 1 can unique identifies the possible connection device. Thus the matching device 1 can record the permission setting between device connections, like the device ID or type of a device permitted or not to connect. The setting can be set by a user or default set on the basis of the device type. The matching device 1 can also record the connected device ID and save them. When a device sends motion signature that is to be matched, the matching device 1 can detect all the device can be connected or not, then only searches and matches the signatures from the device can be connected or eliminates the signatures from the device can not be connected. If there are more match candidates signatures, the system shall priority match the frequently connected devices. For example, the device that a device used to (or recently) connected can be used for first selecting the device signature for matching, fast connection can be set if they match and no more searching is necessary. Further, the matching device 1 can record the connection frequency (or times) between devices, which can be used for selecting signatures for priority matching, that is to first matching the signatures of the devices with connection frequency higher than the threshold. The above information can also be used to weighted calculate the feature matching, such as, Final feature matching=$w1$*initial feature matching+$w2$*connection frequency Here, the initial feature matching is the feature matching between the first signature and the second signature acquired by the matching device 1, in step S302, the final feature matching is the feature matching acquired by final calculation, the connection frequency is the frequency that first signature and the second signature corresponding devices connect, w1, w2 are weightings.

However, it is understood by those skilled in the art that the above auxiliary feature information only by way of example, other existing or potential auxiliary feature information that applicable to this invention should belong to the scope of protection of the invention by reference.

Preferably, the method also comprises step S304 (not shown). In step S304, the matching device 1 pre-processes the first signature and the second signature to acquire the pre-processed first signature and the second signature, in step S302, the matching device 1 matches pre-processed first signature and the second signature on the basis of the motion feature information to acquire the corresponding matching result, wherein, the pre-processing shall comprise any of the following, mapping,
decoding,
encoding.

Specifically, in step S304, the matching device 1 pre-processes like mapping, decoding, encoding the first signature and the second signature to acquire the pre-processed first signature and the second signature. For example, in step S304, the matching device 1 maps the three-dimensional signature to the two-dimensional signature, decoding one of the encoded signature to match another un-encoded signature, encoding one of the un-encoded signature to match another encoded signature, for another example, when the first signature and the second signature are differently encoded, in step S304, the matching device 1 can decode one of the signature and encode the signature with the encoding method of another signature, then the two signature are encoded with the same method for the easier following matching.

Subsequently, in step S302, the matching device 1 matches the pre-processed first signature and the second signature on the basis of the motion feature information to acquire the corresponding matching result.

In this case, since at least the first signature is generated on the basis of the motion signature information of the corresponding motion image, which motion can be captured by a two-dimensional or three-dimensional image device, the second signature can be generated by using MEMS etc. three-dimensional motion detection mode. Different device have different motion detection mode and angle, which generates different signature. Using global features, prominent features, relative size, and affine invariant features has certain advantages, no significant change in signature hardware and capture angle will be produced. For example, the sloshing frequency of global features, the folding point time of prominent features, location and so on will not be changed significantly. Also relative size (up, even, down) can better tolerate the error and noise interference caused by precision detection.

For example, in step S304, the matching device 1 projects the motion or signature of the three-dimensional space onto a two-dimensional space and generates signature (especially images or vertical or direction towards the equipment). The signature generated by MEMS captured three-dimensional motion and the signature generated by the different image device are different on the reflection/projection plane. Image device at different angles have different two-dimensional image plane with some projection relationship, as long as it has relative angle, the conversion can be acquired by simple geometrical relationship.

The signature recording two (three) dimensional trajectory and corresponding position time can map from three-dimensional plane to two-dimensional plane or mapping between different two-dimensional planes. The image device direction can be easily given if the image device has Compass, etc. orientation sensor. The positional relation of the three-dimensional and two-dimensional image plane is also determined. Likewise, the relative direction of any two image devices can be easily acquired. If there is no direction sensor, the traditional image calibration method can also detect the relative direction between different image devices planes (relative calibration) or the absolute position relation of the any image device relative to the earth (absolute calibration).

Once the signatures from different planes are converted into the same plane, their matching effect of the same motion can be more stable. If the plane relationship of two signatures is unknown, the search maximum matching method can be used. When the two signatures generated by the same motion are mapped onto the same plane, they have the maximum matching similarity. Thus, in step S304, the matching device 1 can map one of the signatures at a certain angle and distance (amplification factor) in a certain change range and interval step-by-step (such as clockwise and counterclockwise rotate within 45 degrees by every 5 degrees). Matching with another signature once and record their similarity for each mapping. Ultimately take its maximum similarity value as the final matching value.

However, it is understood by those skilled in the art that the above pre-processing method only by way of example, other existing or potential pre-processing method that applicable to this invention should belong to the scope of protection of the invention by reference.

Preferably, step S301 comprises a sub-step S301a (not shown) and a sub-step S301b (not shown). In sub-step S301a, the matching device 1 acquires the first signature corresponding to the first generation device, wherein, the first signature generates on the basis of the motion signature information of the corresponding motion image, in sub-step S301b, the matching device 1 may also acquires the second signature corresponding to the second generation device, wherein, the second signature generates on the basis of the motion signature information of the corresponding motion image, the second signature and the first signature corresponding to the same predetermined time threshold.

Specifically, in sub-step S301a, the matching device 1 receives the first signature sent by the first generation device by WIFI, Bluetooth, Infrared, Internet etc. mode, for example, the first signature is generated by the first generation device on the basis of the motion signature information of the corresponding motion image, in sub-step S301b, the matching device 1 receives the second signature sent by the second generation device by WIFI, Bluetooth, Infrared, Internet etc. mode, for example, the second signature is generated by the second generation device on the basis of the motion signature information of the corresponding motion image, and the second signature and the first signature corresponding to the same predetermined time threshold. That is, the generation time of the second signature and the first signature corresponding to two different generation devices, the two signatures are generated in the same predetermined period of time.

More preferably, in sub-step S301b, the matching device 1 acquires the second signature in the signature table corresponding to the second generation device on the basis of the first signature, wherein the second signature is generated on the basis of the motion signature information of the corresponding motion image and the second signature and the first signature corresponding to the same predetermined time threshold.

Specifically, in sub-step S301b, the matching device 1 acquires the corresponding second signature in the signature table on the basis of the first signature acquired in sub-step S301a and the first signature generation time information etc., the second signature and the first signature corresponding to the same predetermined time threshold ensures the two signatures are generated in the same predetermined period of time.

Here, for example, the signature table stores a predetermined amount or period of time signatures, and the signatures receive signature sent by corresponding generation device. The signature table can be located in the matching device 1 or a third-party device connected with the matching device 1 via network.

More preferably, the method also comprises step S305 (not shown), in step S305, the matching device 1 can create or update the signature table on the basis of the matching result.

Specifically, in step S305, the matching device 1 creates or updates the signature table on the basis of the matching result, such as stores or deletes signature in the signature table. For example, different devices have different send time, if not match, in step S305, the matching device 1 can store the first signature or the second signature in the signature table for the future signature matching. If match, depending on the application, in step S305, the matching device 1 can delete the stored second signature in the signature table, or, still store for the future signature matching, signatures received in predetermined period of time can be selected in a subsequent match for best match. When signatures stored in the signature table exceed the predetermined amount, or, the generation time of the signature stored in the signature table is earlier than the predetermined time, in step S305, the matching device 1 can delete no longer used signature in accordance with the first in first out or similar rules.

However, it is understood by those skilled in the art that the above signature table creating or updating method only by way of example, other existing or potential signature table creating or updating method that applicable to this invention should belong to the scope of protection of the invention by reference.

Preferably, in sub-step S301b, the matching device 1 acquires more candidate signatures corresponding to more candidate devices, wherein the more candidate signatures are generated on the basis of the motion signature information of the corresponding motion image, and the more candidate signatures and the first signature corresponding to the same predetermined time threshold, wherein, in step S302, the matching device 1 matches the first signature with the more candidate signatures respectively on the basis of the motion signature information to acquire the corresponding more matching results, the method also comprises step S306 (not shown), in step S306, the matching device 1 determines the best matching result from the more matching results and determines the second generation device corresponding to the best match result.

Specifically, in sub-step S301b, the matching device 1 receives more candidate signatures respectively sent by the more candidate devices by WIFI, Bluetooth, Infrared, Internet etc. mode on the basis of the motion signature information of the corresponding motion image through interaction, these candidate signatures and the first signature corresponding to the same predetermined time threshold, alternatively, in sub-step S301b, the matching device 1 acquires more candidate signatures from the signature table that respectively corresponding to more candidate devices, subsequently, in step S302, the matching device 1 matches the first signature with more candidate signatures respectively to acquire the corresponding more matching results, then, in step S306, the matching device 1 determines the best match from the more matching results and determines the corresponding second generation device on the basis of the best match corresponding signature.

Preferably, in step S301, the matching device 1 acquires the first signature and the second signature that are to be matched, wherein the first signature comprises one or more first signature sequences that are generated on the basis of the motion signature information of the corresponding motion image, in step S302, the matching device 1 matches at least one of the one or more first signature sequences with the second signature to acquire corresponding candidate matching results, then determines the matching result corresponding to the first signature and the second signature on the basis of the candidate matching results and predetermined rules.

Specifically, in step S301, the first signature received by the matching device 1 comprises one or more first signature sequences, which can be acquired by packet processing the first signature, the packet can be processed by the first generation device that generated the first signature or the matching device 1.

Subsequently, in step S302, the matching device 1 matches at least one of the one or more first signature sequences with the second signature to acquire corresponding candidate matching results. Here, the matching processing including but not limited to parallel matching processing, the serial matching processing. For example, the parallel matching processing simultaneously matches more first signature sequences with the second signature respectively, the serial matching processing matches one first signature sequence with the second signature first, then matches the second first signature sequence with the second signature. When the matching device 1 parallel matching processing the at least one first signature sequence with the second signature, the matching device 1 may also send the at least one first signature sequence to other matching devices to make more matching devices perform matching processing simultaneously, the matching processing time will be shorten. When the matching device 1 serial matching processing the at least one first signature sequence with the second signature, and the matching device 1 uses "and" mode combine matching results, if one of the first signature sequences and the second signature not match, in step S302, the matching device 1 does not need to matching processing other first signature sequences, the matching processing time will be shorten.

Then, in step S302, the matching device 1 determines the corresponding matching result of the first signature and the second signature on the basis of the acquired candidate matching result and the predetermined rules. For example, if at least one of the candidate matching results match, then the first signature and the second signature match, if the match amount in the candidate matching results exceeds the predetermined threshold, then the first signature and the second signature match, if all the candidate matching results match, then the first signature and the second signature match.

However, it is understood by those skilled in the art that the above predetermined rules only by way of example, other existing or potential predetermined rules that applicable to this invention should belong to the scope of protection of the invention by reference.

Figure 4:
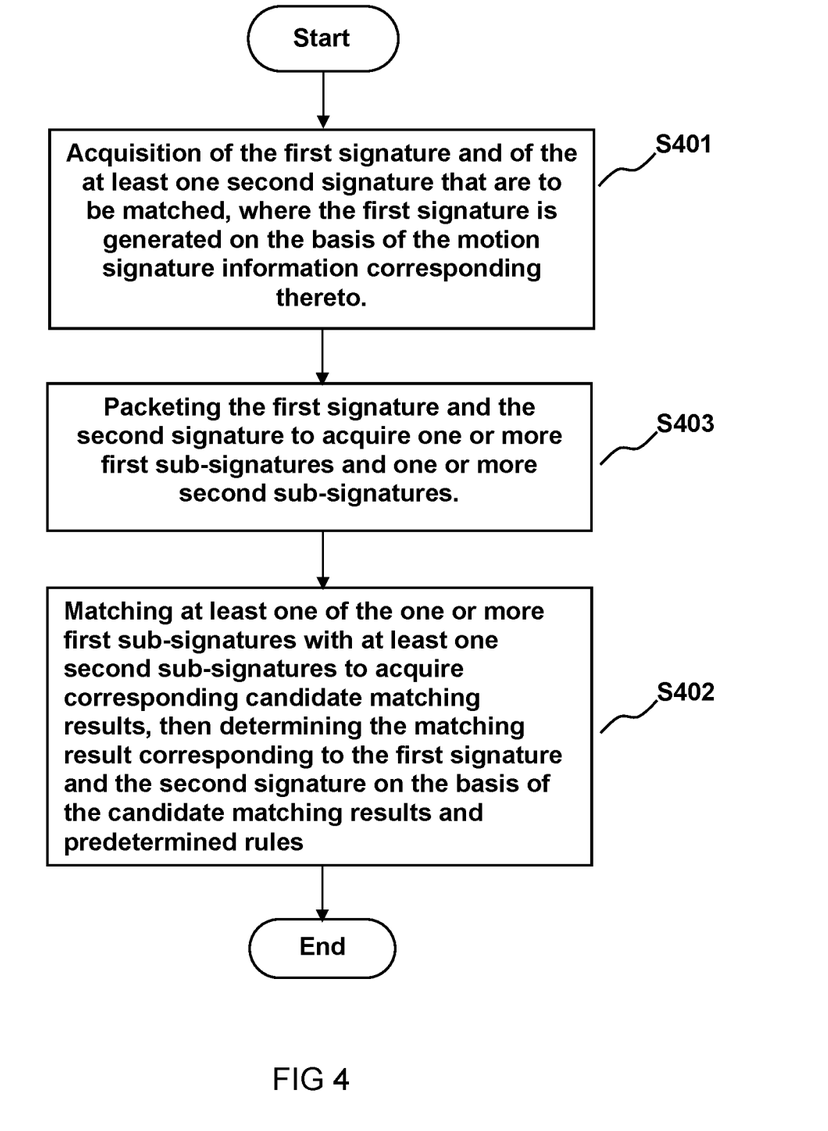
FIG. 4 illustrates a method flow chart of matching signatures on the basis of motion signature information according to a preferred embodiment of the present invention.

FIG. 4 illustrates a method flow chart of matching motion signature on the basis of motion signature information according to another preferred embodiment of the present invention. The method also comprises step S403. Refer FIG. 4 for the details of the preferred embodiment, specifically, in step S401, the matching device 1 acquires the first signature that is to be matched and the at least one second signature, wherein the first signature is generated on the basis of the motion signature information of the corresponding motion image, in step S403, the matching device 1 packets the first signature to acquire one or more first signature sequences, in step S402, the matching device 1 matches at least one of the one or more first signature sequences with the second signature on the basis of the motion signature information to acquire the corresponding candidate matching results, then determines the matching results corresponding to the first signature and the second signature on the basis of the candidate matching results and the predetermined rules. Wherein the step S301 is the same or basically the same with the according one shown in FIG. 1, so won't be covered again while incorporated herein by reference.

In step S403, the matching device 1 packets the first signature to acquire one or more first signature sequences. Specifically, in step S403, the matching device 1 packets the first signature on the basis of the step S401 acquired the first signature as well as the predetermined signature sequence length. For example, packet to acquire one or more the first signature sequences, which may be generated in different motion feature or encoding method, each of the first signature sequence matching can be separately to acquire candidate matching results respectively, the final matching result is the combination of more candidate matching results, each matching can be matched in the same or different matching devices. The final matching result can be the "And", "Or" combination of all candidate matching results. "And" determines match when all candidate matching results is match, the final matching result is match, "Or" determines match when one of the candidate matching result is match, the final matching result is match.

Subsequently, in step S402, the matching device 1 matches at least one of the one or more first signature sequences with the second signatures on the basis of the motion signature information to acquire the at least one corresponding candidate matching result, then determines the matching result corresponding to the first signature and the second signature on the basis of the at least one candidate matching result and predetermined rules.

Preferably, in step S403, the matching device 1 can also packet the second signature to acquire one or more second signature sequences, in step S402, the matching device 1 may match at least one of the one or more first signature sequences with at least one of the one or more second signature sequences to acquire corresponding candidate matching result, then determines the matching result corresponding to the first signature and the second signature on the basis of the candidate matching results and predetermined rules.

Here, the easiest packet processing is to divide a signature into several sections, which is divided into several signature sequences, then sectional matching. Each section can generate encoding on the basis of different motion signature, for example, one signature sequence is generated on the basis of the motion global features, another signature sequence is generated on the basis of the motion prominent features. The packet processing can also be generated on the basis of different encodings, for example, one signature sequence encodes on the basis of the motion signature value, another signature sequence encodes on the basis of the change range or two-valued value. Different signature sequence can be matched in serial mode, that is to match the first section (one first signature sequence and one second signature sequence) and match the next section, if the first section not match, the rest sections combined in "And" may not necessarily match. So the sections with short match searching time can be matched first to avoid the rest time consuming matching. This coarse-to-fine matching strategy can improve the matching speed.

In addition, each section matching can be assigned to different matching devices for improving matching speed and efficiency. In some applications, this approach can also achieve security purpose. For example, device A sends section 1 to device B for matching the section 1 detected by device B, and device B sends section 2 to device A for matching the section 2 detected by device A, they match only when the both two match. Thus, matching is divided into two devices, any device has only one half of the signature and the matching. The device and section combination may be determined by the predetermined rules, such as the device with the minimum serial number and section 1 etc.

The software program of the present invention can be implemented by a processor to perform the steps or functions described hereinabove. Similarly, the software program of the present invention (including associated data structures) can be stored in the computer-readable recording media, for example, RAM memory, magneto-optical drive or floppy disk and similar devices. In addition, some steps or functions of the present invention may be implemented in hardware, such as implementation all steps or functions of the circuit by way of cooperating the processor.

In addition, part of the present invention may be applied as a computer program product, such as computer program instruction which can call or provide methods and/or technical solutions according to the invention by operating the computer when executed by a computer. The program instructions of the present invention calling method may be stored in fixed or removable recording media, and/or are transmitted in the data flow by radio or other signal bearing media, and/or stored in the working storage of the running computer equipment in accordance with the program instructions. Here, one embodiment of the present invention comprises an unit that can be used as a memory for storing computer program instructions and a processor for executing program instructions, wherein, when the computer program instructions being executed by the processor, trigger the device running according to the mentioned embodiments methods and/or technology programs of the present invention.

For skilled in the art, the present invention is clearly not limited to the details of the exemplary embodiments above, but without departing from the spirit or essential characteristics of the present invention, the present invention can be achieved in other specific forms. Therefore, whether from what point of view, the embodiments should be considered as exemplary and non-limiting, the scope of the present invention is defined by the attached claims rather than the above descriptions, therefore, the present invention intends to cover the meaning of claims equivalents and all the changes in the scope. Any reference signs of the claims should not be seen to restrict the referred claims. In addition, apparently the word "comprise" does not exclude other units or steps, the singular does not exclude the plurality. In the device claims, more units or devices can be realized through one unit or device by means of software or hardware. The words like "first", "second" etc. are used to express names but not any particular sequences.

We claim:

1. A system for electrically coupling two electronic devices separated from one another comprising:
a first electronic device having a body dimensioned to be manipulated by a user in three-dimensional space along a trajectory, a MEMS sensor connected to the body and capable of generating a first signal representative of the speed and direction of movement of the first electronic device to define MEMS data, a processor, a memory for storing computer readable instructions when executed by the processor encodes the first signal into a first motion signature according to a first encoding technique, and a transmitter for electronically transmitting the first motion signature to a matching unit;
a second electronic device having a video camera focused on an area for remotely capturing image data of the first electronic device at various points in the trajectory, a processor, a memory for storing computer readable instructions when executed by the processor generates a second signal representative of the image data and encodes the second signal into a second motion signature according to a second encoding technique, and a transmitter for electronically transmitting the second motion signature to a matching unit; and
the matching unit on the first electronic device or the second electronic device and having a receiver for receiving the first motion signature and the second motion signature, a processor, a memory storing computer readable instructions when executed by the processor compares the first motion signature and the second motion signature based on at least two parameters of image line segment feature, image closed contour feature, speed, direction, and trend of the trajectory, and upon finding a match, couples the first electronic device to the second electronic device for a user to control the second electronic device using the first electronic device.

2. The device of claim 1 wherein the parameters further include image feature, and feature of the trajectory.

3. The device of claim 1 wherein the step of encoding includes the use of a Fourier shape descriptor method, a geometric parameter method, a shape invariant moment method, a rotation function method, and a wavelet descriptor method.

4. The device of claim 1 further comprising an orientation device on the second electronic device.

5. The device of claim 1 wherein the video camera is one of: (a) a two-dimensional image device and (b) a three-dimensional image device.

6. The device of claim 1 wherein the matching includes a step of projecting three-dimensional trajectory information onto a two-dimensional plane.

7. The device of 1 wherein the first electronic device and the second electronic device each record auxiliary information of the trajectory, and the matching unit compares the auxiliary information to determine a match.

8. The device of claim 7 wherein the auxiliary information includes time and location.

9. The device of claim 8 wherein the location is acquired by GPS, WIFI, or communication with a base station.

10. The device of claim 1 wherein the first electronic device has a unique device code that is transmitted to the matching unit, and the matching unit saves the unique device code in the memory.

11. The device of claim 1 wherein the MEMS sensor records trajectory data in a first plane, the video camera in a second plane, and the matching unit projects the trajectory in the first plane and the second plane onto a common plane before the comparison step.

12. The device of claim 11 wherein the common plane is oriented relative to the earth.

13. The device of claim 1 further comprising a packet unit configured to packet the second signal into one or more sub-signatures, wherein the matching unit is configured to match at least one of the one or more sub-signatures with the first signal to determine that the first signal was transmitted by the first electronic device.

14. The device of claim 1 wherein the comparison step comprises the step of feature matching using one or more techniques selected from the group consisting of: mean square error matching, fast matching, and Haussdorff point distance matching.

15. The device of claim 1 wherein the comparison step comprises the step of image line segment feature matching using one or more techniques selected from the group consisting of HYPER matching, and Chafer matching.

16. The device of claim 1 wherein the comparison step comprises the step of closed contour feature mapping using one or more techniques selected from the group consisting of Fourier shape descriptor, HRP descriptor, relaxation method, and energy minimizer.

17. The device of claim 1 wherein the first electronic device and the second electronic device couple using one or more of the following techniques: WIFI, Bluetooth, infrared, and internet.

* * * * *